(12) United States Patent
Hui

(10) Patent No.: US 7,458,536 B2
(45) Date of Patent: Dec. 2, 2008

(54) MEASURING TAPE

(75) Inventor: Sun Chao Hui, Yuyao (CN)

(73) Assignee: The Perfect Measuring Tape Co., Toledo, OH (US)

( * ) Notice: Subject to any disclaimer, the term of this patent is extended or adjusted under 35 U.S.C. 154(b) by 347 days.

(21) Appl. No.: 10/529,069

(22) PCT Filed: Mar. 17, 2004

(86) PCT No.: PCT/US2004/008052

§ 371 (c)(1),
(2), (4) Date: Mar. 24, 2005

(87) PCT Pub. No.: WO2004/094937

PCT Pub. Date: Nov. 4, 2004

(65) Prior Publication Data

US 2006/0038050 A1 Feb. 23, 2006

Related U.S. Application Data

(60) Provisional application No. 60/459,528, filed on Apr. 1, 2003.

(51) Int. Cl.
*B65H 75/48* (2006.01)
*G01B 3/10* (2006.01)

(52) U.S. Cl. .............. 242/375.3; 242/381.6; 242/385.4; 33/761; 33/767

(58) Field of Classification Search .............. 242/375.3, 242/379, 381.6, 385.4; 33/761, 767
See application file for complete search history.

(56) References Cited

U.S. PATENT DOCUMENTS

| 111,327 | A | | 1/1871 | Dillingham |
| 166,099 | A | | 7/1875 | Hastings |
| 667,031 | A | | 1/1901 | McGill |
| 889,570 | A | | 6/1908 | Ayers |
| 1,218,798 | A | | 3/1917 | Nelson |
| 1,797,360 | A | | 3/1931 | Nee |
| 2,194,307 | A | | 3/1940 | Jackson |
| 2,952,025 | A | | 9/1960 | Johnson |
| 3,119,424 | A | | 1/1964 | Henry |
| 4,189,107 | A | * | 2/1980 | Quenot et al. ............. 242/390.1 |
| 4,551,847 | A | * | 11/1985 | Caldwell ..................... 377/24 |
| 4,794,692 | A | | 1/1989 | Wang |
| 5,119,521 | A | | 6/1992 | Clontz |
| 5,471,761 | A | * | 12/1995 | Cheng ......................... 33/761 |
| 5,588,220 | A | | 12/1996 | Cousins et al. |
| 5,820,057 | A | * | 10/1998 | Decarolis et al. ......... 242/375.3 |
| 6,158,139 | A | * | 12/2000 | Bond ........................... 33/768 |
| 6,182,916 | B1 | * | 2/2001 | Lin ............................. 242/379 |
| 6,308,432 | B1 | | 10/2001 | Gilliam et al. |
| 6,349,482 | B1 | | 2/2002 | Gilliam |
| 6,382,547 | B1 | * | 5/2002 | Yang .......................... 242/379 |
| D473,807 | S | | 4/2003 | Bohnengel |
| 6,715,214 | B1 | * | 4/2004 | Lin ............................. 33/755 |
| 7,003,895 | B2 | * | 2/2006 | Harris et al. .................. 33/755 |
| 7,024,790 | B1 | * | 4/2006 | Qilian ......................... 33/755 |

* cited by examiner

*Primary Examiner*—Sang Kim
(74) *Attorney, Agent, or Firm*—Fraser Clemens Martin & Miller LLC; J. Douglas Miller

(57) ABSTRACT

A measuring tape housed within an ergonomically configured housing with a spirally wound spring motor is disclosed which facilitates the paying out and retraction of the flexible metal blade carrying the measuring indicia thereon.

18 Claims, 3 Drawing Sheets

MEASURING TAPE

CROSS-REFERENCE TO RELATED APPLICATION

This application claims the benefit of U.S. provisional patent application Ser. No. 60/459,528, filed Apr. 1, 2003.

BACKGROUND OF THE INVENTION

1. Field of the Invention

This invention relates to measuring tapes and more particularly to a measuring tape housed within an ergonomically configured housing with a spirally wound spring motor facilitating the paying out and retraction of the flexible metal blade carrying the measuring indicia thereon.

2. Description of the Prior Art

The conventional measuring tape structure typically includes a housing containing an elongate blade of flexible material such as cloth, metal, or plastic carrying the measuring indicia such as inches, feet, yards, for example, wound around a rotatable shaft which is spring loaded. In use, the leading free end of the blade may be pulled from the housing a sufficient amount to expose enough of the blade to accomplish the desired measuring function. Upon completion of the measuring function, the exposed portion of the blade may be released and allowed to be retracted into the housing by the associated spring and wound onto the spring biased rotating shaft.

While the presently available measuring tapes usually function without fault, as the requirement for measuring longer lengths has required the associated housings to become quite large in order to accommodate the increased length of measuring blade wound upon the spring biased rotatable shaft.

In order to maintain the overall exterior dimension within the limits of the grasp of the user and to permit the assembly to be carried by an associated tool, for example, the spring and the flexible blade were longitudinally spaced apart. Such structure is illustrated in U.S. Pat. No. 5,119,521 issued Jun. 9, 1992 to William C. Clontz.

Although the aforementioned design was functional, the system included a complex combination of several cooperating gears and the use of a pair of spaced apart shafts for the expansion and retraction of a coiled spring.

SUMMARY OF THE INVENTION

It is an object of the present invention to produce a measuring tape including a housing capable of accommodating a relatively extensive flexible blade containing the measuring indicia carried on one rotatably mounted shaft and a longitudinally spaced spirally wound spring motor rotatably mounted on a second shaft and coupled to the first shaft by an associated driving belt.

Another object of the invention is to produce a measuring tape containing a first rotatably mounted shaft for the measuring indicia carrying blade and a spirally wound spring motor mounted on a second shaft wherein the indicia containing blade and the spring motor are coupled together. As the blade is caused to be payed off of the first shaft, the spring motor is caused to be wound, tightening the coils of the spring motor on the second shaft. When the blade is finally allowed to return into the housing, the spring motor causes a rotation of the first shaft effecting a rewinding of the blade on to the first shaft.

Still another object of the invention is to produce a measuring tape structure wherein a spring motor is caused to be tightened during the withdrawal of the blade and will retract the blade once the blade is released.

The above objects may be achieved by a measuring tape comprising a hollow housing; a first shaft having an axis of rotation and mounted with the housing; an elongate flexible blade having a free end and a terminal end, the free end adapted to extend out of the housing, and the terminal end attached to the first shaft; a second shaft having an axis and mounted within the housing in spaced relation from the first shaft; a spiral spring mounted on the second shaft and having one end attached to the second shaft and the other end adapted to be moved to a biasing position upon movement of the blade out of the housing; and pulley and belt means for transmitting rotating movement of the first shaft to the other end of the spiral spring.

BRIEF DESCRIPTION OF THE DRAWINGS

The above as well as other objects and advantages of the invention will become readily apparent to those skilled in the art from reading the following detailed description of an embodiment of the invention when considered in the light of the accompanying drawings, in which.

DETAILED DESCRIPTION OF THE PREFERRED EMBODIMENT

Figure 1:
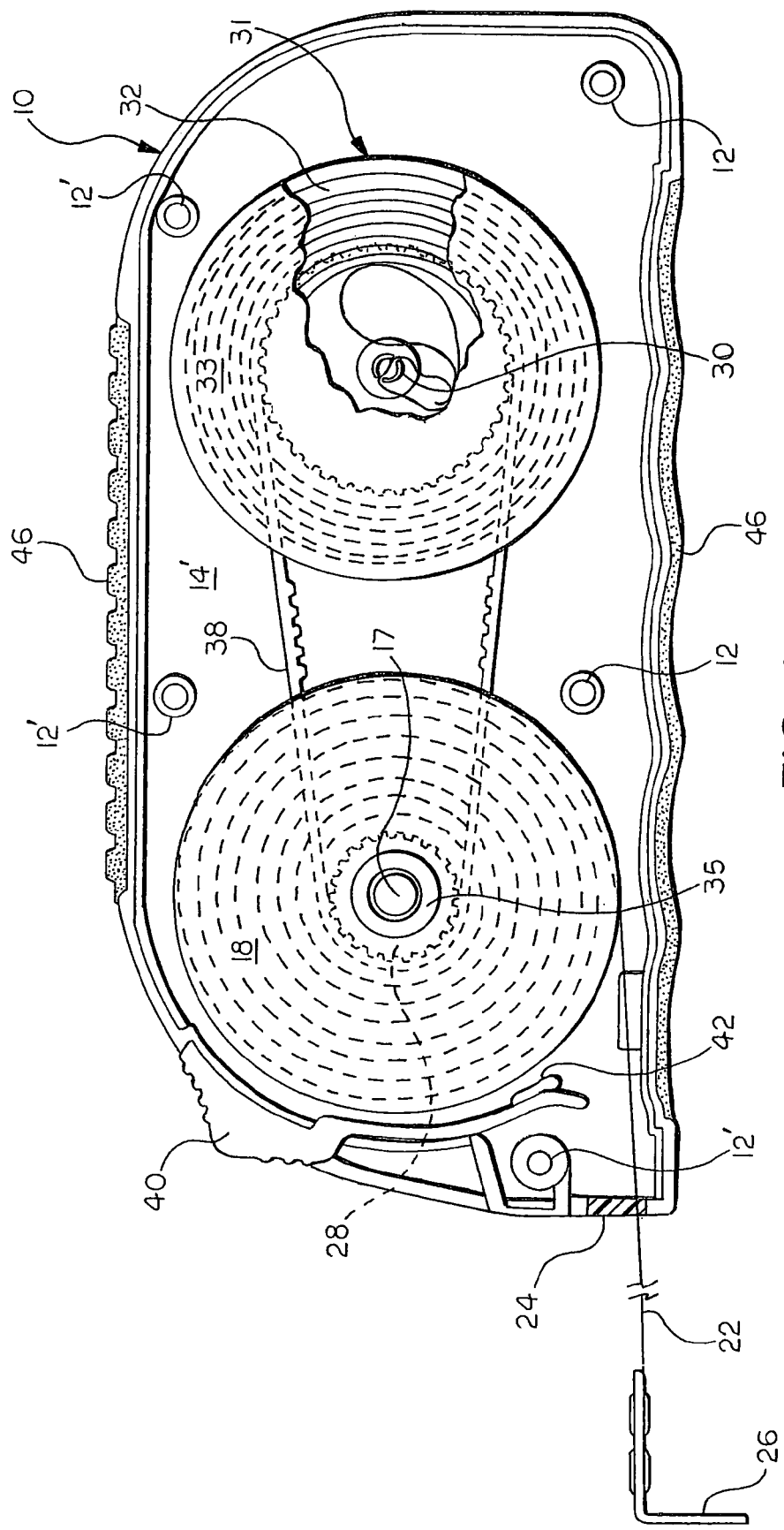
FIG. 1 is an elevational view of one side of a measuring tape incorporating the features of the present invention, partially in section with portions cut-away is clearly illustrated in the structure thereof.
Figure 2:
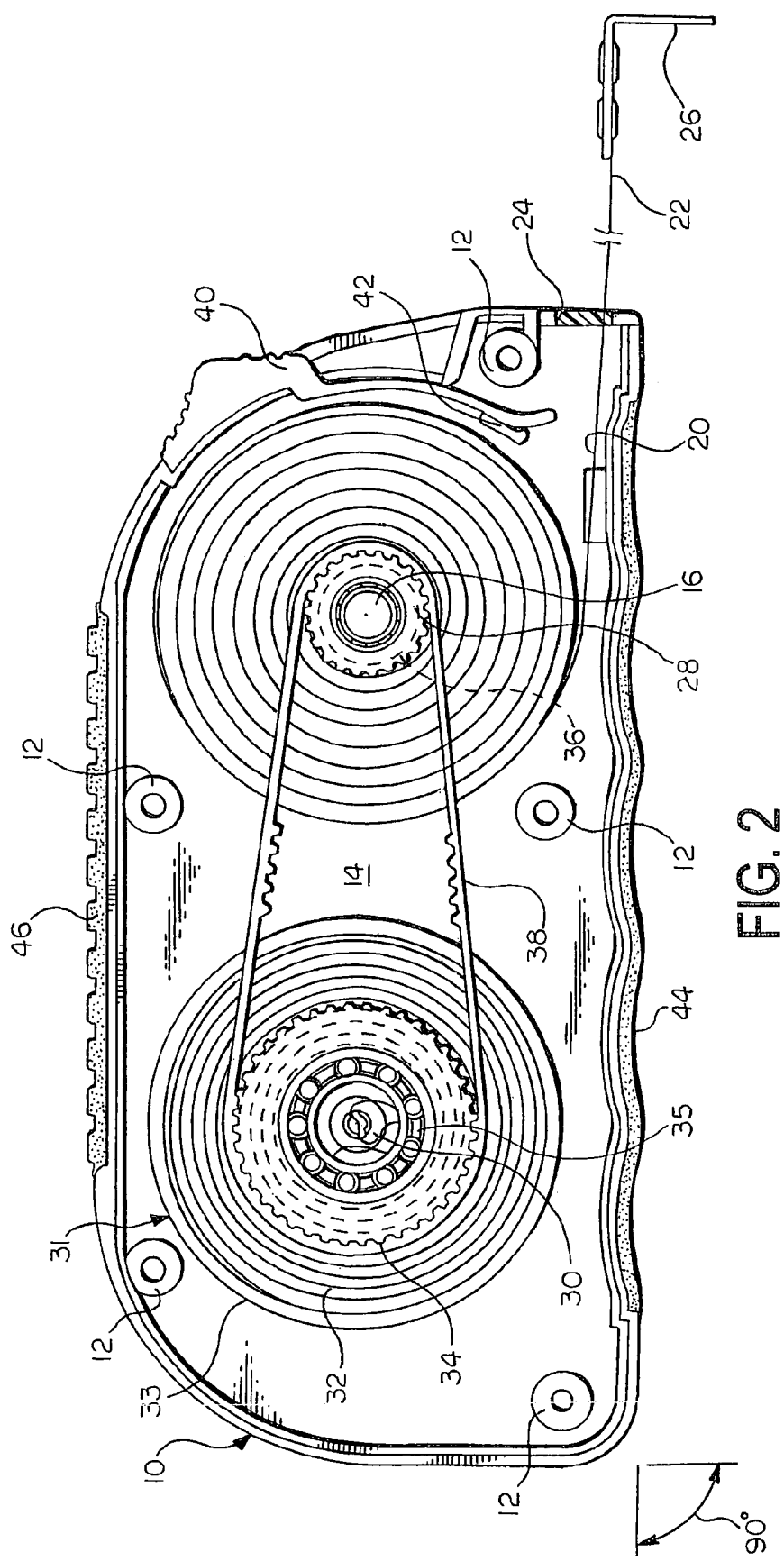
FIG. 2 is an elevational view in section from the opposite side of the measuring tape illustrated in FIG. 1.

Referring to the drawings, there is illustrated a measuring tape embodying the features of the invention. More specifically, there is illustrated a measuring tape having a hollow relatively elongate housing 10 which may be fabricated from any suitable material such as plastic, for example. The housing 10 is typically formed of two mating sections fastened together by threaded fasteners, for example, received within suitably disposed openings 12 integrally formed in the side wall 14 of one of the sections. The fasteners are threadably received with suitably arranged and aligned openings 12' formed in the side wall 14' of other of the cooperating mating sections.

A stub shaft 16 is formed to extend transversely from the side wall 14 of the housing 10. A cooperating stub shaft 17 is formed to extend transversely from the opposing side wall 14' in aligned relation with the shaft 16. A spool 18 is rotatably mounted on the shafts 16 and 17 and is adapted to receive the terminal end of a flexible blade 20. The blade 20 is mounted in a coil form on the spool 18 wherein the leading free end 22 thereof is adapted to extend out of the housing 10 through a slot 24. The leading free end 22 of the blade 20 is provided with an L-shaped fixture 26 adapted to function as a stop for the leading free end 22 of the blade 20, preventing the blade 20 from retracting completely into the interior of the housing 10. A sheave or pulley 28 is attached to the side wall of the spool 18.

A split shaft 30 is mounted to extend transversely between the side walls 14, 14' of the housing 10 in spaced relation from the cooperating stub shafts 16 and 17. The axes of the shafts 16, 17, and 30 are disposed generally parallel with one another.

Figure 3:
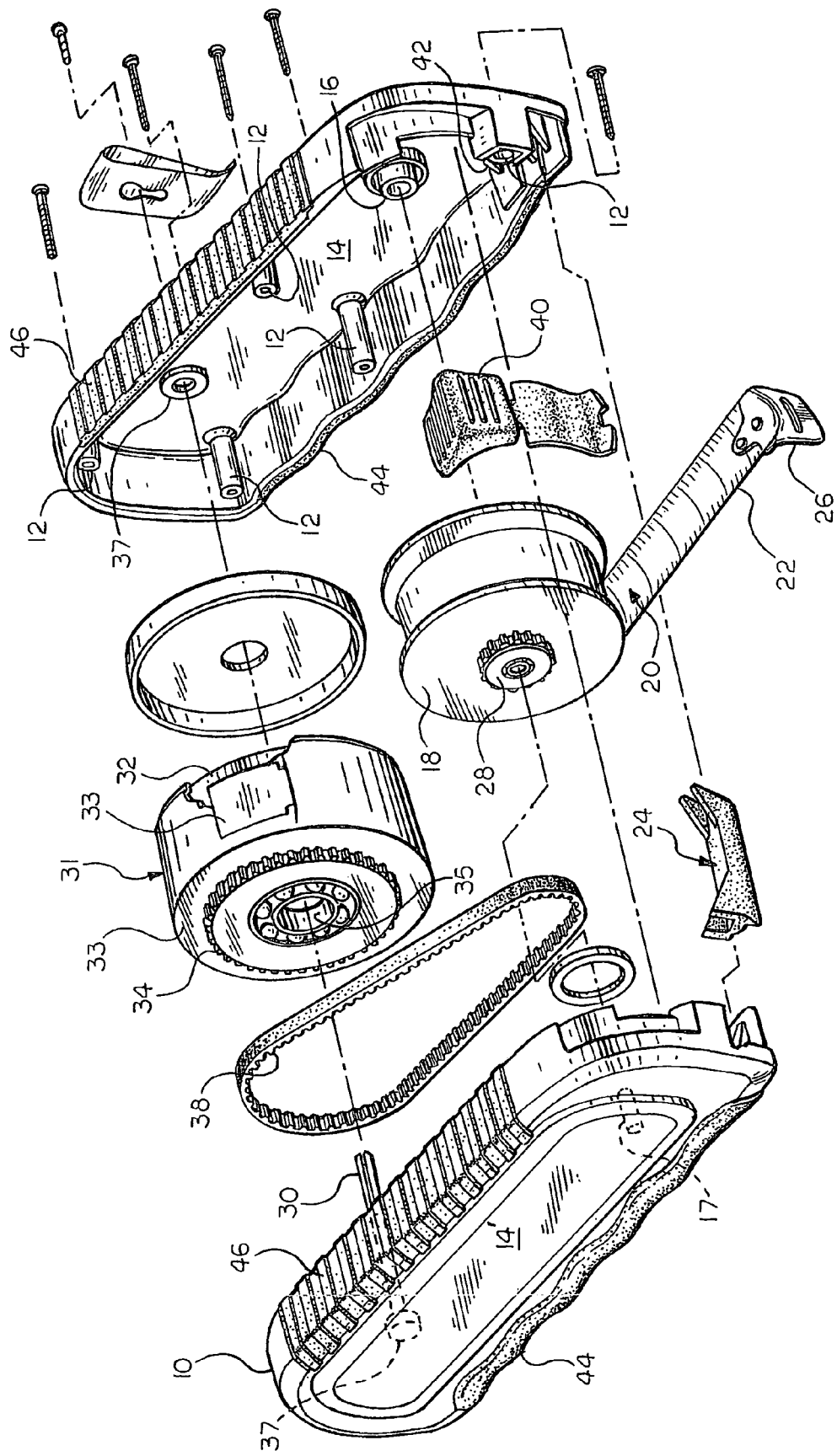
FIG. 3 is an exploded perspective view of the measuring tape illustrated in FIGS. 1 and 2.

A spiral spring assembly 31 including a spirally wound spring 32 is mounted on the shaft 30 such that one end of the spring 32 is attached to the shaft 30 by being fitted within the split or slotted portion thereof while the opposite end is suitably secured to a housing 33 of the spiral spring assembly 31, as illustrated in FIG. 3.

A sheave or pulley 34, having a centrally disposed bearing assembly 35, is affixed to the housing 33. The entire spiral spring assembly 31 including the spiral spring 32, the spring housing 33, the sheave 34, and the bearing assembly 35 is mounted on a boss 37 and 37' which are typically formed integral with the inner surface of the side walls 14, 14', respectively. A belt 38 drivingly interconnects the sheaves or pulleys 28 and 34.

A brake mechanism including a manually operating slide 40 having a brake pad 42 mounted at one end thereof is slidingly mounted to the housing 10.

Finger and hand inserts 44 and 46, respectively, are suitably affixed to the outer surface of the housing 10. The inserts 44 and 46 are typically made of an elastomeric material, such as rubber, for example.

It will be noted that at least one corner of the housing 10 is formed such that the mating edges of the bottom and end wall are joined to form a right angle corner, thus permitting the assembly to be used in measuring from a structure wherein two planar surfaces are joined together at right angles to one another.

In operation, the housing 10 is grasped by one hand of a user, while the other hand grasps the fixture 26 on the leading free end 22 of the blade 20. The blade 20 is pulled out of the housing 10 to the degree necessary to accomplish the desired measuring assignment. During such operation, the coiled spring 32 is placed under tension and resists the paying off of the blade 20 from the spool 18. At the conclusion of the measuring assignment, the fixture 26 is released allowing the spring 32 to cause rotational movement of the sheave or pulley 34. The rotation of the sheave 34 will, in turn, cause rotation of the sheave 28 by translating motion through the associated belt 38. Thus, the blade 20 is caused to be retracted into the housing 10 and wound about the spool 18.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A measuring tape comprising:
a first shaft;
a spool and a first sheave turnable together about said first shaft;
an elongate flexible blade having a free end and a terminal end, the free end adapted to extend out of a housing, said blade wound upon said spool when in a fully retracted position on said spool;
a second shaft;
a spiral spring assembly and a second sheave turnable together about said second shaft, said spiral spring assembly including a spring housing and a spirally wound spring, the spirally wound spring wound around the second shaft and contained within the spring housing so as to wind and unwind about said second shaft as said spring housing and said second sheave turn; and
a belt connecting said first sheave and said second sheave, whereby extension of said blade from its retracted position causes turning of said spool which in turn causes turning of said spring assembly to place the spring of said spring assembly in a spring-wound condition which spring will cause retraction of said blade upon release of said blade from an extended position.

2. A measuring tape as defined in claim 1 further comprising the housing enclosing said spool, said first sheave, said blade, said spring a second sheave, and said belt, said housing having a top, bottom sides, and ends with said elongate flexible blade having said free end adapted to extend out of said housing, the free end including a fixture adapted to be grasped by a user so as to extend said blade from its extracted position substantially inside said housing.

3. A measuring tape as defined in claim 2 wherein said housing includes at least two spaced apart inwardly facing side wall surfaces defining a hollow interior of said housing, wherein the side wall surfaces are substantially flat.

4. A measuring tape as defined in claim 1 including distance measuring indicia imprinted on said elongate flexible blade.

5. A measuring tape as defined in claim 1 wherein the spring of said spring assembly includes a bias which increases in proportion to the extent of said flexible blade caused to be paid off of said spool.

6. A measuring tape as defined in claim 1 including hand and finger contoured pads secured to an exterior surface of the housing.

7. A measuring tape as defined in claim 1 wherein the free end of said elongate blade includes a bracket which militates against the passage of the free end into the housing.

8. A measuring tape comprising:
a first shaft;
a spool and a first sheave turnable together about said first shaft;
an elongate flexible blade having a free end and a tenninal end, the free end adapted to extend out of a measuring tape housing, said blade wound upon said spool when in a frilly retracted position on said spool;
a second shaft;
a spiral spring assembly including a spring housing, a bearing assembly, and a spirally wound spring, the spring housing coupled to a second sheave and turnable together about said second shaft on said bearing assembly, the spirally wound spring having a first end and a second end, the first end secured to the second shaft and the second end secured to the spring housing, the spirally wound spring wound around the second shaft and contained within the spring housing so as to wind and unwind about said second shaft as said spring housing and second sheave turn; and
a belt connecting said first sheave and said second sheave, whereby extension of said blade from its retracted position causes turning of said spool which in turn causes turning of said spring assembly to place the spring of said spring assembly in a spring-wound condition which spring will cause retraction of said blade upon release of said blade from an extended position.

9. The measuring tape of claim 8, wherein the first shaft is a first stub shaft having the spool rotatably mounted thereon, the first shaft integrally formed with the measuring tape housing.

10. The measuring tape of claim 8, wherein the second shaft is a non-rotating shaft having one of a split and a slotted portion to which the first end of the spirally wound spring is secured.

11. The measuring tape of claim 8, wherein the bearing assembly is mounted on a boss integrally formed with the measuring tape housing.

12. The measuring tape of claim 11, wherein a portion of the second shaft is disposed within the boss.

13. The measuring tape of claim 8, wherein the bearing assembly includes a plurality of ball bearings.

14. The measuring tape of claim 8, further including a sliding brake mechanism with a manually operable slide having a brake pad mounted at one end thereof, the sliding mechanism mounted to the measuring tape housing.

15. The measuring tape of claim 8, wherein the spring housing includes a cup portion for containing the spirally wound spring, the cup portion having a lip surrounding an open end of the cup portion and formed therein.

16. The measuring tape of claim 15, wherein the spring housing includes a lid portion that cooperates with the lip of the cup portion to seal the spirally wound spring inside the spring housing.

17. The measuring tape of claim 16, wherein the cup portion and the lid portion have apertures formed therein through which the second shaft is disposed.

18. The measuring tape of claim 8, wherein the first shaft is a first stub shaft with the spool rotatably mounted thereon, the first shaft secured to the measuring tape housing; wherein the second shaft is a non-rotating split shaft having one of a split and a slotted portion to which the first end of the spirally wound spring is disposed; wherein the bearing assembly is mounted on a boss integrally formed with the measuring tape housing; and wherein a portion of the second shaft is disposed within the boss.

* * * * *